United States Patent
Magargal et al.

(10) Patent No.: US 10,557,583 B2
(45) Date of Patent: Feb. 11, 2020

(54) RISER CAP AND IRRIGATION PIPING SYSTEM USING SAME

(71) Applicant: North American Pipe Corporation, Houston, TX (US)

(72) Inventors: John R. Magargal, Souderton, PA (US); Gary A. Leigh, Kennett Square, PA (US)

(73) Assignee: NORTH AMERICAN PIPE CORPORATION, Houston, TX (US)

(*) Notice: Subject to any disclaimer, the term of this patent is extended or adjusted under 35 U.S.C. 154(b) by 318 days.

(21) Appl. No.: 15/707,852

(22) Filed: Sep. 18, 2017

(65) Prior Publication Data

US 2018/0003325 A1 Jan. 4, 2018

Related U.S. Application Data

(63) Continuation of application No. 13/891,561, filed on May 10, 2013, now Pat. No. 9,765,913, which is a continuation of application No. 12/977,307, filed on Dec. 23, 2010, now Pat. No. 8,459,698.

(51) Int. Cl.
| | |
|---|---|
| *F16L 41/14* | (2006.01) |
| *F16L 37/14* | (2006.01) |
| *F16L 47/28* | (2006.01) |

(52) U.S. Cl.
CPC .............. *F16L 41/14* (2013.01); *F16L 37/148* (2013.01); *F16L 47/28* (2013.01)

(58) Field of Classification Search
CPC .................................. F16L 41/14; F16L 47/28
USPC .......................... 285/5, 143.1, 200–209, 600
See application file for complete search history.

(56) References Cited

U.S. PATENT DOCUMENTS

| | | | | | |
|---|---|---|---|---|---|
| 2,077,155 | A | * | 4/1937 | Prudden | B60R 13/0815 112/428 |
| 3,104,120 | A | * | 9/1963 | Ahlport | F16L 41/14 285/154.1 |
| 3,357,516 | A | * | 12/1967 | Cadotte | E04B 1/86 181/290 |
| 3,726,056 | A | * | 4/1973 | Harris | E04C 2/32 52/483.1 |
| 3,971,573 | A | * | 7/1976 | Clements | F16L 23/08 285/5 |
| 4,234,125 | A | * | 11/1980 | Lieding | B05B 15/74 239/111 |

(Continued)

*Primary Examiner* — James M Hewitt, II
(74) *Attorney, Agent, or Firm* — Lempia Summerfield Katz LLC

(57) ABSTRACT

A polymeric riser cap member includes a central tubular section defining a generally cylindrical bore for receiving a sprinkler riser, the central tubular section having open top and bottom ends, and an annular skirt coaxial with the central tubular section and having an inner diameter larger than an inner diameter of the central tubular section. The annular skirt has an inner surface having internal threads threadably connectable with the externally threaded surface of a tubular riser adapter member of a tubular coupler. The bottom end of the central tubular section has an annular projection disposed opposite and spaced from a portion of the annular skirt. The riser cap member includes an annular recess adapted to receive a seal located in a wall extending laterally between the annular skirt and the annular projection.

19 Claims, 6 Drawing Sheets

(56) References Cited

U.S. PATENT DOCUMENTS

| | | | | |
|---|---|---|---|---|
| 4,428,454 A * | 1/1984 | Capaul | E04B 1/86 | 181/290 |
| 4,760,677 A * | 8/1988 | Nassof | E04B 9/28 | 52/145 |
| 4,787,558 A * | 11/1988 | Sexton | B05B 15/70 | 239/205 |
| 4,842,548 A * | 6/1989 | Bolante | F16L 47/04 | 174/653 |
| 5,120,084 A * | 6/1992 | Hashimoto | F02M 55/005 | 285/133.11 |
| 5,217,138 A * | 6/1993 | Nichols | B65D 25/16 | 220/495.06 |
| 5,239,877 A * | 8/1993 | Suddath | B01L 5/02 | 137/561 A |
| D350,816 S * | 9/1994 | Florence | D23/260 | |
| 5,511,826 A * | 4/1996 | Clare | F16L 23/024 | 285/305 |
| 5,545,441 A * | 8/1996 | Land | D06N 3/042 | 427/389.8 |
| 5,624,074 A * | 4/1997 | Parisi | E03C 1/06 | 138/134 |
| 5,681,408 A * | 10/1997 | Pate | B32B 5/26 | 156/71 |
| 6,108,994 A * | 8/2000 | Bodine | E04B 9/28 | 52/506.07 |
| 6,155,493 A * | 12/2000 | Kearby | B05B 1/3006 | 239/205 |
| 6,234,411 B1 * | 5/2001 | Walker | B05B 15/00 | 239/289 |
| 6,263,912 B1 * | 7/2001 | Brown | B05B 15/70 | 137/519.5 |
| 6,302,445 B1 * | 10/2001 | Kugele | F16L 37/008 | 285/360 |
| 6,547,159 B1 * | 4/2003 | Westby | B05B 15/60 | 239/204 |
| 6,648,377 B2 * | 11/2003 | Marandi | F16L 41/06 | 285/197 |
| 6,772,859 B2 * | 8/2004 | D'Antonio | E04B 1/84 | 181/293 |
| 7,017,831 B2 * | 3/2006 | Santiago | B05B 3/0431 | 239/200 |
| 7,021,392 B2 * | 4/2006 | Bentzien | B05B 15/65 | 169/37 |
| 7,121,589 B2 * | 10/2006 | Hawkinson | E03B 3/03 | 285/139.2 |
| 7,189,794 B2 * | 3/2007 | Maurer | C08G 63/6956 | 528/26 |
| 7,261,247 B2 * | 8/2007 | Yeh | B05B 3/0431 | 239/237 |
| 7,472,840 B2 * | 1/2009 | Gregory | B05B 15/70 | 239/289 |
| 7,523,965 B2 * | 4/2009 | Masarwa | F16L 41/14 | 239/547 |
| 7,600,699 B2 * | 10/2009 | Kah, Jr. | B05B 15/74 | 239/203 |
| 7,644,870 B2 * | 1/2010 | Alexander | B05B 15/70 | 239/1 |
| 7,908,813 B2 * | 3/2011 | Gulbrandsen | E04B 9/0414 | 52/506.07 |
| 8,662,414 B2 * | 3/2014 | Causby | A01G 25/023 | 239/201 |
| 8,950,789 B2 * | 2/2015 | Jahan | B05B 1/044 | 285/259 |
| 2003/0154679 A1 * | 8/2003 | Swiszcz | E04B 9/001 | 52/506.07 |
| 2003/0155433 A1 * | 8/2003 | Gregory | B05B 1/3026 | 239/203 |
| 2005/0009428 A1 * | 1/2005 | Porter | B32B 5/02 | 442/129 |
| 2005/0023375 A1 * | 2/2005 | Tanczos | B05B 15/16 | 239/288 |
| 2005/0194464 A1 * | 9/2005 | Bruninga | B05B 15/70 | 239/200 |
| 2006/0071098 A1 * | 4/2006 | McCormick | B05B 1/3402 | 239/504 |
| 2008/0079258 A1 * | 4/2008 | Siegel | F16L 21/002 | 285/5 |
| 2008/0142618 A1 * | 6/2008 | Smith | B05B 3/0436 | 239/240 |
| 2008/0230628 A1 * | 9/2008 | Alexander | B05B 15/70 | 239/205 |
| 2008/0256879 A1 * | 10/2008 | Babineau | E04B 9/001 | 52/145 |
| 2010/0176217 A1 * | 7/2010 | Richmond | B05B 15/70 | 239/205 |
| 2010/0294854 A1 * | 11/2010 | McAfee | A01G 25/06 | 239/204 |
| 2011/0057048 A1 * | 3/2011 | McAfee | B05B 15/70 | 239/1 |
| 2012/0161433 A1 * | 6/2012 | Magargal | F16L 37/148 | 285/133.3 |

* cited by examiner

RISER CAP AND IRRIGATION PIPING SYSTEM USING SAME

CROSS-REFERENCE TO RELATED APPLICATIONS

The present application is a Continuation of U.S. patent application Ser. No. 13/891,561, filed May 10, 2013, which is a Continuation of U.S. patent application Ser. No. 12/977,307, filed Dec. 23, 2010, both of which are incorporated by reference herein in their entirety.

FIELD OF THE INVENTION

The present invention relates to irrigation systems, and, more particularly, to devices for coupling sprinkler risers to irrigation piping.

BACKGROUND

Sprinkler irrigation has over the years replaced many other forms of irrigation methods because it minimizes erosion, prevents many drainage problems, does not require land leveling, and provides light application of moisture for irrigating crops.

Sprinkler systems are typically classified by the degree of their portability. For example, there are permanent systems, fully portable systems which can be moved from one field to another, and semi-portable systems where the piping is movable but the pumping plant is in a fixed location.

U.S. Pat. No. 6,302,445 to Kugele et al. entitled "Irrigation Pipe System" (hereinafter, Kugele et al.), the entirety of which is hereby incorporated by reference herein, discloses a prior art portable irrigation pipe system. With reference to FIGS. 10 and 11 thereof, the irrigation system includes a tubular coupler member for coupling a pair of pipes together, a riser adapter extending from the coupler member, a riser cap threadably coupled to the riser adapter, a shaft seal disposed within the riser cap, and a sprinkler riser with a riser lock member welded thereon for interlocking with the riser cap to secure the sprinkler riser to the tubular coupler member. Kugele et al.'s system, specifically the inner diameter of the riser adapter, dictates the specific size of sprinkler riser that can be coupled to the tubular coupler member. For example, the commercial embodiment of Kugele's design, marketed as the CERTA-SET™ lateral piping system by CertainTeed Corp. of Valley Forge, Pa., is designed for ½" metal riser pipes. At present, no coupling mechanism exists for coupling sprinkler risers of larger sizes, such as ¾" riser pipes, to the tubular coupler of Kugele et al.

An alternative system for coupling a sprinkler riser to a tubular coupler member, such as that disclosed in Kugele et al., is desired.

SUMMARY OF THE INVENTION

An irrigation pipe system is provided. In one embodiment, the irrigation pipe system includes a tubular coupler member having at least one open end adapted for connection to a fluid transport pipe. The tubular coupler member has a tubular riser adapter member in fluid communication with a central region thereof. The tubular riser adapter member has an externally threaded surface. The system includes a riser cap member having a central tubular section defining a generally cylindrical bore for receiving a sprinkler riser and having open top and bottom ends. The riser cap member has an annular skirt coaxial with the central tubular section and having an inner diameter larger than an inner diameter of the central tubular section. The annular skirt has an inner surface having internal threads threadably connectable with the externally threaded surface of the tubular riser adapter member. The irrigation piping system also includes a seal. The riser cap member is connected to the tubular riser adapter member of the tubular coupler member by inserting the bottom end of the central tubular section inside of the tubular riser adapter member and threadably connecting the internal threads of the annular skirt to the externally threaded surface of the tubular riser adapter member, with the seal disposed between the tubular riser adapter member and the riser cap member.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1:
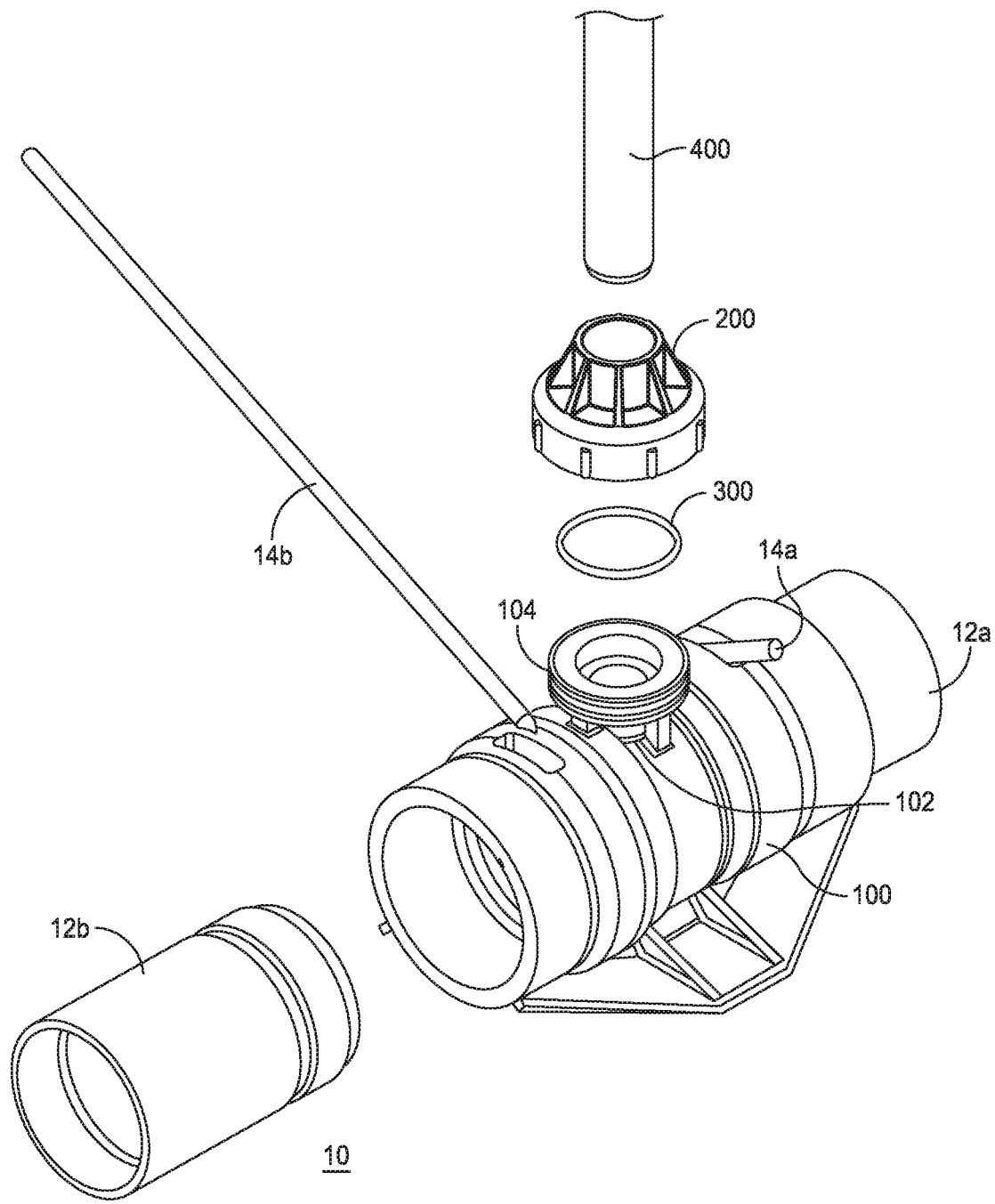
FIG. 1 is an exploded view of an irrigation pipe system according to an embodiment of the present invention.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof(e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Referring to the exploded view of FIG. 1, there is illustrated an embodiment of a fully or semi-portable irrigation pipe system, generally identified by reference numera 110. System 10 includes a tubular coupler member 100 (sometimes referred to in the industry as a "sled") having first and second open ends adapted for connection to ends of first and second fluid transport pipes 12a, 12b. It should be understood that while the tubular coupler member 100 is illustrated as having two open ends, it may have one open end and one closed end. As such, tubular coupler member 100 has at least one open end. Pipes 12 are dimensioned to receive the ends of coupler member 100. Coupler member 100 and pipes 12 may be fabricated from any suitable substantially rigid material such as metal or plastic. According to a presently preferred embodiment, these components are formed from polyvinyl chloride (PVC) or fiber reinforced resin.

Pipes 12 may be connected to coupler member 100 by any suitable releasable connection means such as cooperating threading or the like. However, it is more preferable that the coupler member 100 and pipes 12 be releasably joined by flexible spline connections 14, two of which (14*a*, 14*b*) are illustrated.

In a flexible spline connection, annular grooves are provided in the coupler member and the pipes that are to be connected to the coupler member. When the pipes are mated with the coupler member, the annular grooves align to form annular cavities. Thereafter, a flexible spline 14 is inserted into and snugly received in the annular cavities to thereby prevent separation of the pipes from the coupler member. This coupling technique is described in Kugele et al. and in U.S. Pat. No. 5,511,826 to Clare et al., the entirety of which is also hereby incorporated by reference herein.

Tubular coupler member 100 includes a cylindrical riser adapter 102 having a central passageway in fluid communication with the interior of the tubular coupler member 100. Riser adapter 102 is preferably provided with external threading 104 for matingly engaging with matching internal threading of a riser cap 200, which is described in more detail below in connection with the remaining figures. The elements of system 10 described thus far (i.e., pipes 12, splines 14 and tubular coupler member 100) are disclosed and fully described in Kugele et al. In addition to pipes 12, tubular coupler 100, riser cap 200, the system 10 also includes O-ring seal 300 for disposal within riser cap 200, and sprinkler riser 400 (shown in partial). It should be understood that sprinkler riser 400 can have any desired length and is typically between 1-2 feet in length and has a sprinkler (not shown) attached at the top end thereof.

As noted in the Background section, Kugele et al.'s solution, which has been commercialized by CertainTeed Corp. of Valley Forge, Pa. as the CERTA-SET™ lateral piping system, is designed to couple only one size of sprinkler riser (e.g., ½" metal riser, where the size is defined by ASTM standard) to the tubular coupler member 100. Specifically, the matching internal diameter of the central passageway of the riser adapter and of the riser cap of Kugele's system (FIGS. 10 and 11 of Kugele et al.) is sized with respect to a specific metal riser. Improved sprinkler performance can be achieved using sprinkler risers (e.g., ¾" risers, where the size is defined by ASTM standard) that are larger and thus cannot be received in the passageway of Kugele's riser adapter and riser cap are designed to receive. However, it is undesirable to redesign the tubular coupler 100 and its riser adapter to accommodate these larger risers. As such, an improved riser cap member 200 is provided that is adapted to couple a larger diameter sprinkler riser to existing tubular coupler member 100 of the type just described.

Figure 2:
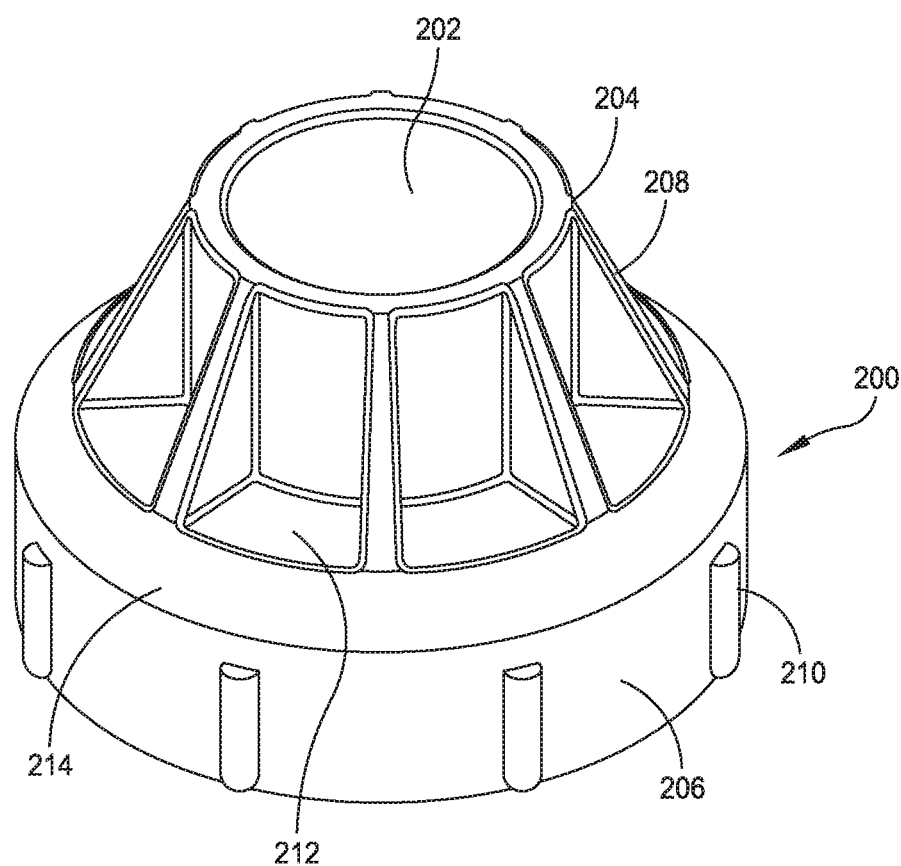
FIG. 2 is a perspective view of a riser cap member according to an embodiment of the present invention.
Figure 3:
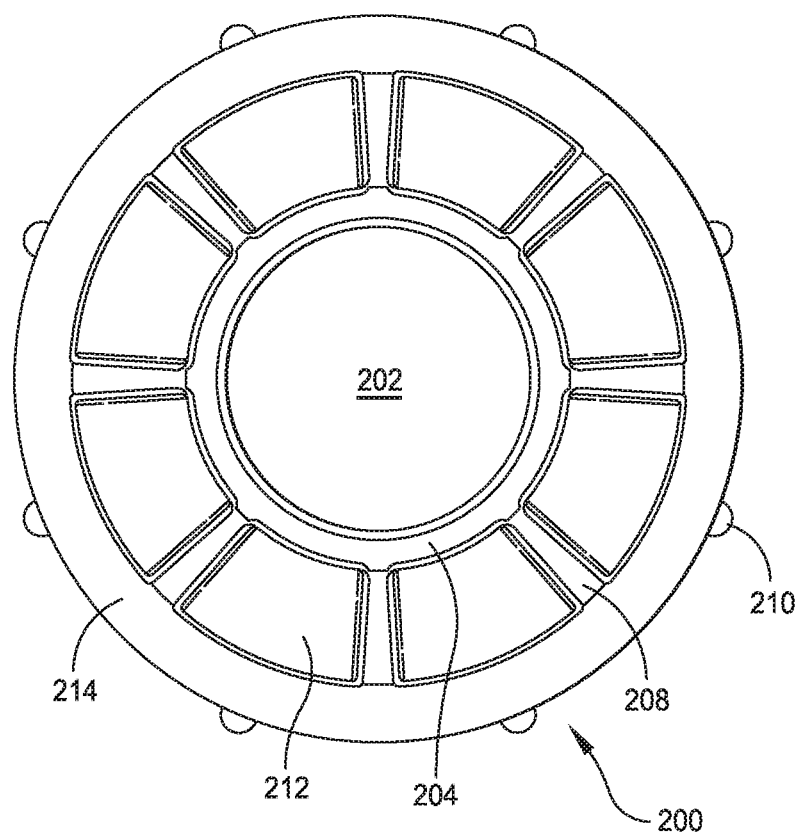
FIG. 3 is a top plan view of the riser cap member of FIG. 2.
Figure 4:
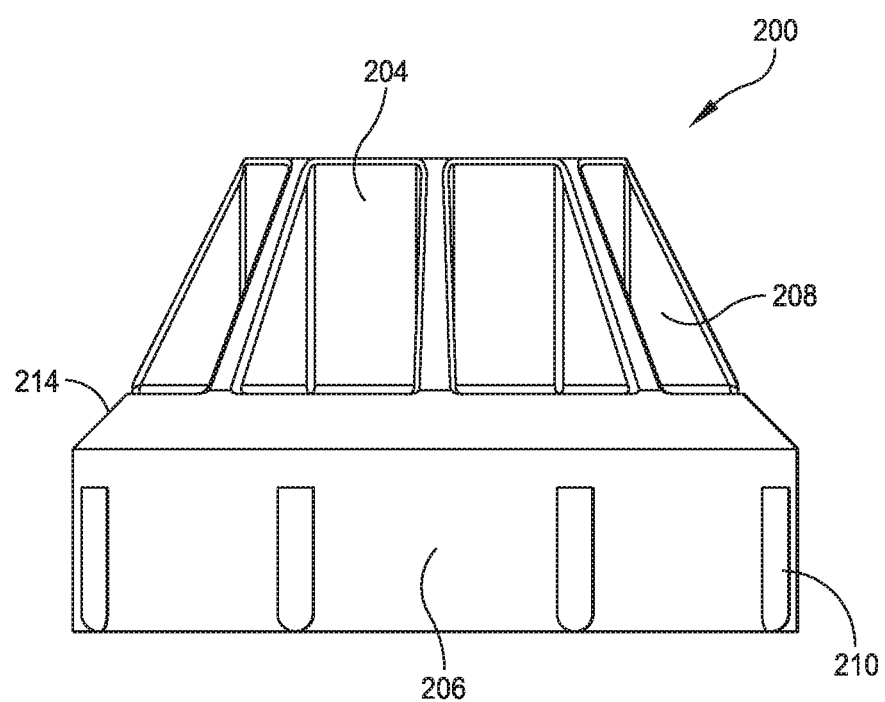
FIG. 4 is a side view of the riser cap member of FIG. 2.
Figure 5:
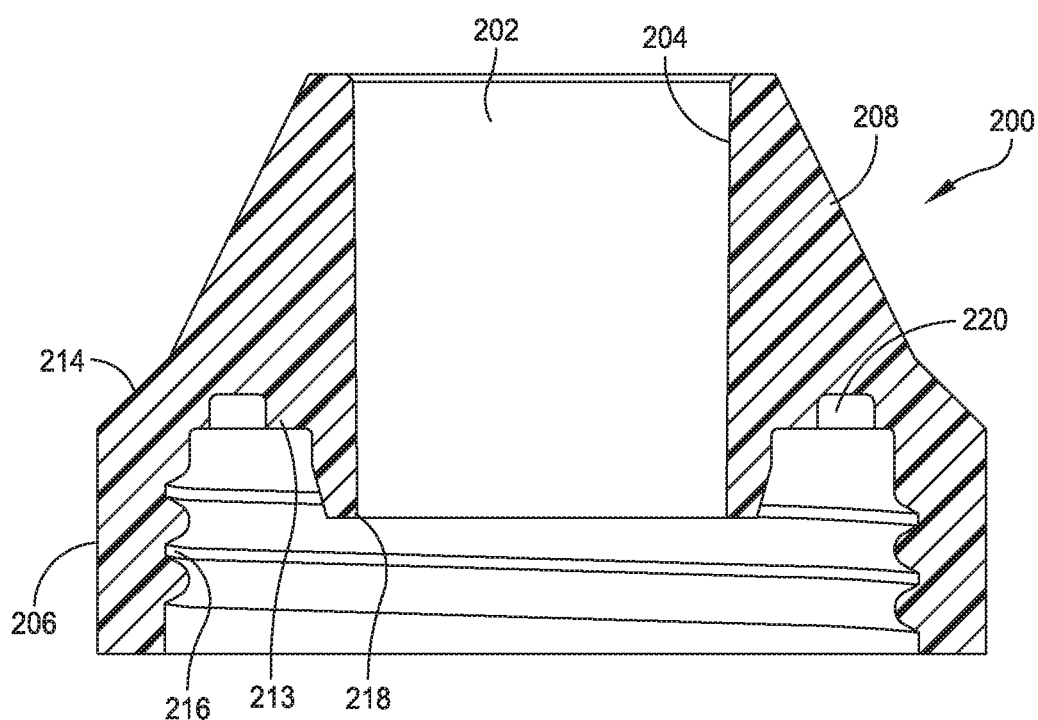
FIG. 5 is a cross-sectional view of the riser cap member of FIG. 2.

FIG. 2 is a perspective view of a riser cap member 200 that is adapted to be threadably connected to the riser adapter 102. FIGS. 3 and 4 are top and side views of the riser cap member 200, respectively. FIG. 5 is a cross-sectional view of the riser cap member 200. With reference to those figures, the riser cap member 200 has a central tubular section 202 having a generally cylindrical bore for receiving a tubular sprinkler riser, which can be bonded to the riser cap member by, for example, a cement or, more preferably, solvent weld bond. The opening of tubular section 202 is defined by a central cylindrical wall 204. A second cylindrical wall or skirt 206 of larger internal diameter than the central cylindrical wall 204 is coaxial with the central cylindrical wall 204. A portion of the wall 204 forms an annular extension or projection 218 opposite and spaced from the inner surface of the skirt 206. The inner surface of the skirt 206 has internal threads 216 formed thereon and adapted for threadably connecting to the external threads 104 of the riser adapter 102 of the tubular coupler member 100.

In embodiments, an annular flange 212 extends radially from the outer surface of first annular wall 204 from a circumferential location between the top and bottom ends of the central tubular section 202. The skirt 206 depends downwardly from a distal the end of the annular flange 204. A sloped surface 214 transitions from the upper surface of flange 204 to the outer surface of the skirt 206, which includes a plurality of gripping nubs or protrusions 210 spaced around the circumference of the skirt 206 to facilitate its manual installation and removal from the riser adapter 102.

A plurality of reinforcing members, such as eight gussets or ribs 208, are evenly spaced around the outer circumference of the central cylindrical wall 204 and extend from the wall 204 to the upper surface of flange 212. These ribs 208 provide structural stability for the wall 204 against cracking, particularly when exposed to forces generated by an attached sprinkler moving back and forth during operation or bending forces created by physical manipulation and incidental impact of the sprinkler riser during relocation of the irrigation piping system.

With specific reference to the cross-sectional view of FIG. 5, an annular channel or recess 220 is formed in the wall 213 that connects the annular projection 218 to the skirt 206. This recess 220 is located and adapted to receive a seal 300 (FIG. 1 and FIG. 6), such as an O-ring seal 300. The 0-ring seal may be formed from natural or artificial rubber or rubber-like material. In one embodiment, the 0-ring seal is a nitrile o-ring (−222), where −222 refers to the size of the o-ring per Aerospace Industry Standard AS 568A for o-ring dimensions and tolerances. The −222 size has an inside diameter of 1½" (1.484" actual) and a cross section diameter/width of ⅛" (0.139" actual) yielding an outside diameter of 1¾ (1.762" actual).

Figure 6:
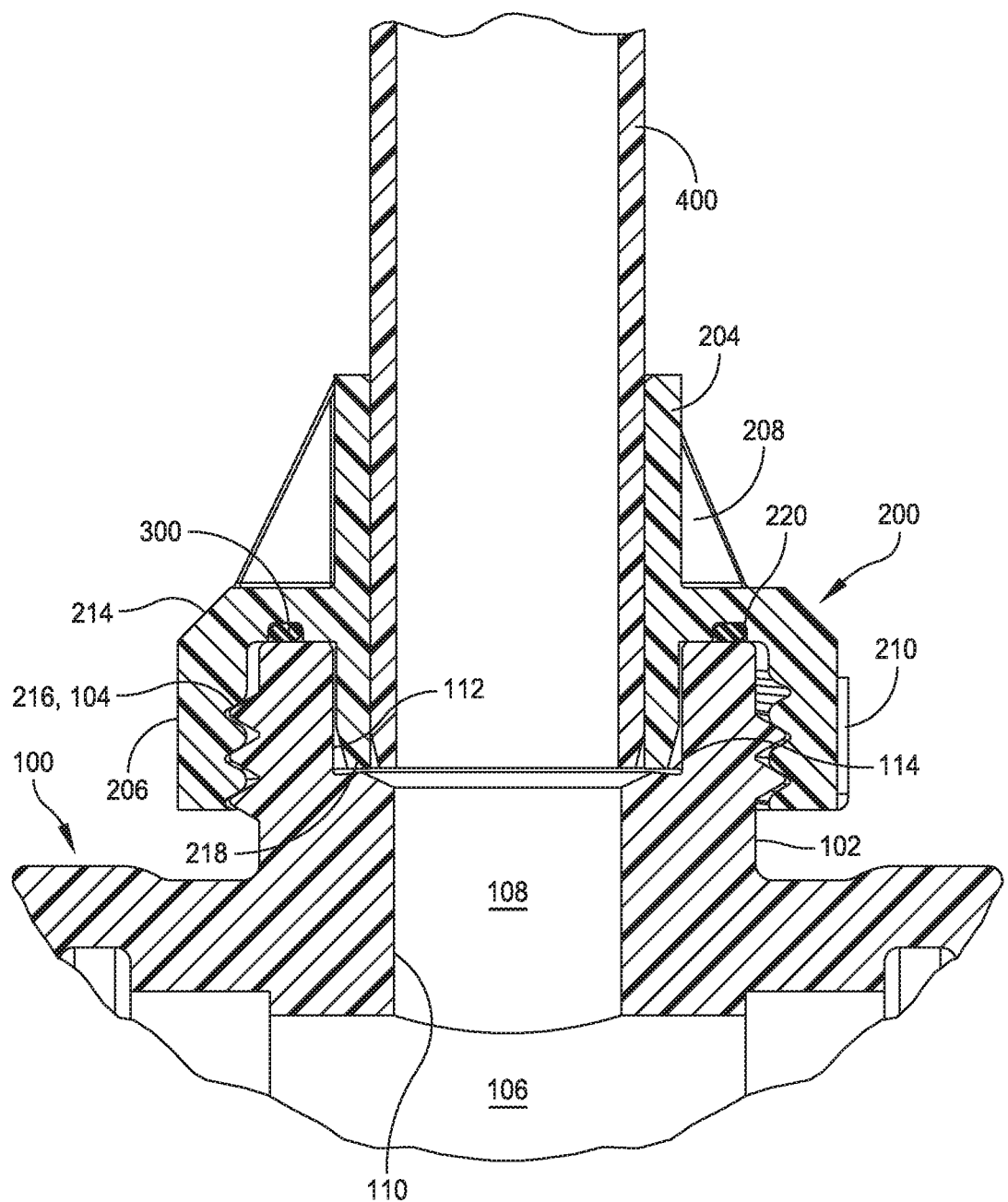
FIG. 6 is a cross-sectional view showing the riser cap member of FIG. 2 and riser coupled to the tubular coupler of FIG. 1.

FIG. 6 is a partial cross-sectional view showing the riser cap member 200 threadably connected to the riser adapter member 102 of the tubular coupler member 100. A sprinkler riser 400 is also shown having a first end disposed in the tubular section 2020 of the riser cap member 200 and extending therefrom. As shown in FIG. 6 the riser adapter 102 has a first tubular section defined by wall 110, which defines a generally cylindrical central passageway 108 having a first internal diameter. This cylindrical central passageway 108 is in fluid communication with the open region 106 of the tubular coupler 100. This internal diameter (as defined by wall 110) is sized to receive therein a small sprinkler riser (e.g., ½" sprinkler riser) as can be seen in Kugele et al. (FIG. 11). The riser adapter 102 also has a larger tubular section defined by annular wall 112 which is designed to receive a compressible seal fitted between the wall 112 and the outer surface of the shaft of a small diameter sprinkler riser (e.g., a ½" metal sprinkler riser). In contrast to the construction of Kugele et al., a portion of the riser cap member 200 is inserted in the cylindrical section defined by wall 112. Specifically, the projection 218 is disposed within this cylindrical section defined by wall 112 and, in embodiments, seated on the shoulder 114 that connects wall 110 to wall 112. The fit between the outer surface of the annular projection 218 and the wall 112 is preferably a snug, flush fit or interference fit. Nonetheless, an O-ring seal 300 is provided in the channel 220 to ensure a fluid tight seal exists between the riser adapter 102 and the riser cap member 200. The coupling approach illustrated in FIG. 6 allows for the connection of larger diameter sprinkler risers (e.g., ¾") to the riser adapter 102 than could be received within the narrower passageway 108 defined by wall 110.

Disposing the annular projection 218 within the riser adapter 102 provides lateral stability to the coupling assembly against breakage or cracking, such as during relocation of the irrigation piping system. Moreover, projection 218 provides additional length to the riser cap member 200 for bonding to a sprinkler riser, as described in more detail below. Designing projection 218 to be of a proper length for seating on shoulder 114 (i.e., approximately the height of wall 112) also helps provide a substantially continuous, uninterrupted passageway from fluid passageway 108 into the sprinkler riser with minimal leakage toward seal 300.

While FIG. 6 shows cap member 200 and sprinkler riser 400 as separate components, this is for illustration purposes only. It should be understood that in exemplary embodiments, both sprinkler riser 400 and riser cap member 200 are formed from a polymeric material, preferably PVC, and the cap member 200 and sprinkler riser 400 (e.g., ¾" sprinkler riser) are solvent welded to one another to form a combined riser cap member/sprinkler riser that is a seamless integrated product. In solvent welding, a solvent is applied which can temporarily dissolve the polymer at room temperature. When this occurs, the polymer chains are free to move in the liquid and can mingle with other similarly dissolved chains in the other component. After sufficient time, the solvent will permeate through the polymer and out into the environment, so that the chains lose their mobility. This leaves a solid mass of entangled polymer chains which constitutes the solvent weld.

An exemplary method of assembling a piping system using the components described herein includes the following steps in no required order unless the context dictates such:

(1) Detachably connecting one or more pipes 12 to a tubular coupler member 100 using one or more splines 14.

(2) Bonding a sprinkler riser 400 to a riser cap member 200 (FIG. 7) with, for example, a solvent weld to form an integral, seamless product. The sprinkler riser 400 is of a size that is larger than can be accommodated in the fluid passageway 108 of the tubular coupler member 100.

(3) Lubricating and stretching an 0-ring seal around the annular projection 218 of the riser cap member 200 (before or after bonding to sprinkler riser 400) and seating the 0-ring seal at least partially in annular recess 220.

(4) (5) Disposing the riser cap member 200 over the riser adapter 102. Threadably engaging the internal threads 216 of the riser cap member 200 with the external threads 104 of the riser adapter, and rotating the riser cap member 200 to secure the riser cap member 200 to the riser adapter 102, creating a fluid tight connection between the combined riser cap member 200 and the tubular coupler member 100.

The riser cap member 200 described herein allows for use of a full plastic irrigation system. Prior designs used a small diameter metal riser with a riser lock member welded thereto for engaging the riser cap. Using the riser cap member 200, a plastic (e.g., PVC) sprinkler riser can be used without a riser lock member. The sprinkler riser is simply bonded directly to the riser cap member, which is threadably engaged with the existing riser adapter of the tubular coupler member. A riser of larger diameter, and thus greater flow, can be coupled to the tubular coupler member without changing the design of the existing tubular coupler member or its riser adapter. This provides great flexibility in the use of either smaller (e.g., ½" metal) or larger (¾" PVC) riser tubes with the same coupler in the field.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. An irrigation pipe system, comprising:
a coupler having a body configured to be connected to a fluid transport pipe, the coupler comprising a riser adapter extending from the body in fluid communication with the coupler, the riser adapter comprises external threads, and the body and the riser adapter are integrally formed together;
a riser cap having a bore that is smooth and configured to receive a sprinkler riser at a top end thereof, the bore has a bottom end, the riser cap comprises an annular skirt coaxial with the bore, the annular skirt having an inner diameter larger than an inner diameter of the bore, and the annular skirt comprises internal threads configured to couple with the external threads of the riser adapter;
a seal; and
the riser cap is configured to be coupled to the riser adapter of the coupler by inserting the bottom end inside the riser adapter and threadably connecting the internal threads of the annular skirt to the external threads of the riser adapter and, when the riser cap is coupled to the riser adapter, the seal contacts only an axial surface of the riser adapter.

2. The irrigation pipe system of claim 1, wherein the riser adapter has a first tubular section and a second tubular section, the first and second tubular sections are connected by a shoulder, the second tubular section has an internal diameter that is greater than an internal diameter of the first tubular section.

3. The irrigation pipe system of claim 2, wherein the bottom end of the riser cap has an annular projection that, when the riser cap is coupled to the riser adapter, seats on the shoulder, and the riser adapter is free of contact with the sprinkler riser when the sprinkler riser is mounted to the riser cap.

4. The irrigation pipe system of claim 1, wherein the riser cap comprises an annular recess configured to receive the seal, and the annular recess is located only in an axial wall extending radially between the central tubular section and the annular skirt.

5. The irrigation pipe system of claim 1, further comprising:
an annular flange extending radially from an outer surface of the riser cap between top and bottom ends thereof, wherein the annular skirt depends from the annular flange; and
reinforcing members spaced around the riser cap and extending between the outer surface of the riser cap and the annular flange.

6. The irrigation pipe system of claim 1, wherein the sprinkler riser is configured to be bonded to the riser cap.

7. The irrigation pipe system of claim 1, wherein the sprinkler riser and the riser cap comprise polyvinyl chloride (PVC).

8. A combined riser cap and sprinkler riser for connection in a piping system to a tubular coupler having at least one open end configured to be connected to a fluid transport pipe, the tubular coupler having a tubular riser adapter in fluid communication with a central region thereof, the tubular riser adapter having an externally threaded surface, the combined riser cap and sprinkler riser comprising:
  a riser cap having a central tubular section defining a generally cylindrical bore, and an annular skirt coaxial with the central tubular section and having an inner diameter larger than an inner diameter of the central tubular section, the annular skirt having an inner surface having internal threads threadably connectable with the externally threaded surface of the tubular riser adapter; and
  a sprinkler riser having a first end configured to be disposed within the cylindrical bore of the riser cap, and the sprinkler riser is configured to be bonded to the riser cap.

9. The combined riser cap and sprinkler riser of claim 8, wherein the sprinkler riser is permanently bonded to the riser cap.

10. The combined riser cap and sprinkler riser of claim 8, wherein the sprinkler riser and the riser cap comprise polyvinyl chloride (PVC).

11. The combined riser cap and sprinkler riser of claim 8, wherein a bottom end of the central tubular section has an annular projection opposite and spaced from a portion of the annular skirt.

12. The combined riser cap and sprinkler riser of claim 11, wherein the riser cap includes an annular recess adapted to receive a seal located in a wall extending laterally between the annular skirt and the annular projection.

13. The combined riser cap and sprinkler riser of claim 8, further comprising:
  an annular flange extending radially from an outer surface of the central tubular section between top and bottom ends thereof, wherein the annular skirt depends from the annular flange; and
  a plurality of reinforcing members spaced around the central tubular and extending between the outer surface of the central tubular and the annular flange.

14. A riser cap for connecting a sprinkler riser in a piping system to a tubular coupler having at least one open end configured to be connected to a fluid transport pipe, the tubular coupler having a tubular riser adapter in fluid communication with a central region thereof, the tubular riser adapter having an externally threaded surface, the riser cap comprising:
  a central tubular section defining a generally cylindrical bore for receiving a sprinkler riser, the central tubular section having open top and bottom ends, and an annular skirt coaxial with the central tubular section and having an inner diameter larger than an inner diameter of the central tubular section, the annular skirt having an inner surface having internal threads threadably connectable with the externally threaded surface of the tubular riser adapter, the bottom end of the central tubular section having an annular projection disposed opposite and spaced from a portion of the annular skirt, wherein the riser cap includes an annular recess adapted to receive a seal located in a wall extending laterally between the annular skirt and the annular projection.

15. The riser cap of claim 14, wherein the riser adapter has a first tubular section and a second tubular section, the first and second tubular sections are connected by a shoulder, the second tubular section has an internal diameter that is greater than an internal diameter of the first tubular section, and the riser cap has an annular projection that is concentric with the annular skirt and co-extends an axial portion of the cap bore.

16. The riser cap of claim 15, wherein an outer diameter of the annular projection is approximately equal to the internal diameter of the second tubular section.

17. The riser cap of claim 15, wherein the sprinkler riser is permanently bonded to the bore of the riser cap with a solvent weld, and the sprinkler riser is located axially only within the second tubular section of the riser adapter.

18. The riser cap of claim 15, wherein the riser cap comprises an annular recess formed only axially therein, and the seal is located in the annular recess.

19. The riser cap of claim 15, wherein each of the tubular coupler, pipes, riser cap and sprinkler riser comprises polyvinyl chloride (PVC), and the annular projection is seated on the shoulder.

* * * * *